(12) United States Patent
Atwood et al.

(10) Patent No.: US 10,160,194 B2
(45) Date of Patent: Dec. 25, 2018

(54) SYSTEMS AND METHODS FOR IMPLEMENTING HIGH SPEED FINAL SURFACE CURING FOR THREE DIMENSIONAL (3D) PRINTED PARTS AND COMPONENTS

(71) Applicant: XEROX Corporation, Norwalk, CT (US)

(72) Inventors: Christopher Atwood, Webster, NY (US); Elizabeth Crossen, Churchville, NY (US)

(73) Assignee: Xerox Corporation, Norwalk, CT (US)

( * ) Notice: Subject to any disclaimer, the term of this patent is extended or adjusted under 35 U.S.C. 154(b) by 675 days.

(21) Appl. No.: 14/637,249

(22) Filed: Mar. 3, 2015

(65) Prior Publication Data
US 2016/0257066 A1    Sep. 8, 2016

(51) Int. Cl.
*B29C 67/00*    (2017.01)
*B33Y 50/00*    (2015.01)
(Continued)

(52) U.S. Cl.
CPC .......... *B33Y 50/00* (2014.12); *B29C 35/0805* (2013.01); *B29C 64/20* (2017.08);
(Continued)

(58) Field of Classification Search
CPC ............ B29C 67/0051; B29C 67/0055; B29C 67/0059; B29C 67/0062; B29C 67/0066;
(Continued)

(56) References Cited

U.S. PATENT DOCUMENTS

2007/0298362 A1*  12/2007  Rocha-Alvarez ............................ F27B 17/0025 432/9
2012/0013980 A1*  1/2012  Begon ..................... B29C 63/16 359/465
(Continued)

OTHER PUBLICATIONS

Nesvadba, Peter, "Radical Polymerization in Industry", Performance Chemical Research, BASF Schweiz AG, Basel, Switzerland, published 2012 in the Encylopedia of Radicals in Chemistry, Biology and Materials, John Wiley & Sons, Ltd., accessed May 19, 2018. (Year: 2012).*

Primary Examiner — Matthew J Daniels
Assistant Examiner — Lawrence D. Hohenbrink, Jr.
(74) Attorney, Agent, or Firm — Caesar Rivise, PC (57) ABSTRACT

A system and method are provided for implementing a comparatively higher speed process for surface curing of finished three-dimensional (3D) printed parts, objects and/or components, formed and/or otherwise manufactured in 3D printing systems and/or in additive material manufacturing processes. A vacuum finish curing chamber is provided within, or associated with one or more 3D printers to provide a locally-generated substantially oxygen depleted curing environment to support effective and efficient surface curing of one or more formed 3D printed parts. The vacuum finish curing system includes at least one device for emitting curing radiation and at least one object transport system for transporting formed 3D objects to the vacuum finish curing chamber without requiring user handling that would be hazardous to handling individuals.

16 Claims, 4 Drawing Sheets

(51) Int. Cl.
  *B33Y 10/00* (2015.01)
  *B33Y 30/00* (2015.01)
  *B33Y 40/00* (2015.01)
  *B29C 71/04* (2006.01)
  *B29C 35/08* (2006.01)
  *B29C 64/20* (2017.01)
  *B33Y 50/02* (2015.01)
  *B29C 64/264* (2017.01)
  *B29C 64/236* (2017.01)
  *B29C 64/386* (2017.01)
  *B29C 64/379* (2017.01)
  *B29C 64/106* (2017.01)
  *B29C 64/112* (2017.01)
  *B29C 64/393* (2017.01)

(52) U.S. Cl.
  CPC .............. *B29C 71/04* (2013.01); *B33Y 10/00* (2014.12); *B33Y 30/00* (2014.12); *B33Y 40/00* (2014.12); *B29C 64/106* (2017.08); *B29C 64/112* (2017.08); *B29C 64/236* (2017.08); *B29C 64/264* (2017.08); *B29C 64/379* (2017.08); *B29C 64/386* (2017.08); *B29C 64/393* (2017.08); *B29C 2035/0827* (2013.01); *B29C 2035/0838* (2013.01); *B29C 2791/006* (2013.01); *B33Y 50/02* (2014.12)

(58) Field of Classification Search
  CPC ............ B29C 35/0805; B29C 35/0888; B29C 2035/0827; B29C 2035/0838; B29C 2035/0833; B29C 71/04; B29C 64/106; B29C 64/112; B29C 64/236; B29C 64/264; B29C 64/379; B29C 64/386; B29C 64/393; B33Y 10/00; B33Y 30/00; B33Y 40/00; B33Y 50/00; B33Y 50/02
  USPC ............... 425/174.4, 375; 264/401, 494, 308
  See application file for complete search history.

(56) References Cited

U.S. PATENT DOCUMENTS

| | | | |
|---|---|---|---|
| 2012/0268538 A1* | 10/2012 | Kondo | B41J 2/155 347/102 |
| 2013/0320235 A1* | 12/2013 | Lien | H01L 21/67115 250/454.11 |
| 2014/0191439 A1* | 7/2014 | Davis | B29C 67/0051 264/259 |
| 2016/0136787 A1* | 5/2016 | Bajaj | B24B 37/22 51/298 |
| 2017/0253017 A1* | 9/2017 | Lingier | B41C 1/1016 |

* cited by examiner

SYSTEMS AND METHODS FOR IMPLEMENTING HIGH SPEED FINAL SURFACE CURING FOR THREE DIMENSIONAL (3D) PRINTED PARTS AND COMPONENTS

BACKGROUND

1. Field of the Disclosed Embodiments

This disclosure relates to systems and methods for implementing a comparatively higher speed process for surface curing of finished three-dimensional (3D) printed parts, objects and/or components, formed and/or otherwise manufactured in 3D printing systems and/or in additive material manufacturing processes.

2. Related Art

Three-dimensional or 3D printing generally refers to a broad class of techniques (also referred to as "additive material manufacturing" or AM techniques) that are usable for producing three-dimensional parts, objects or components ("3D printed parts") often through a repetitive layer-by-layer material deposition process. 3D printing techniques employ one or more processes that appear, in many respects, similar to well-known comparable processes for forming two-dimensional (2D) printed images on image receiving media substrates. The significant differences in the output structures produced by the 3D printing techniques, even as those techniques may be adapted from loosely related 2D printing processes are generally based on (1) a composition of the deposited materials that are used to form the output 3D printed parts from the 3D printer; and (2) a number of passes made by the "print" heads in depositing comparatively large numbers of successive layers of the deposition material to build up the layers to the form of the output 3D printed parts. In sophisticated 3D printers, an ability of the printing apparatus to translate among multiple axes such as, for example, at the end of a robotic arm, provides a capacity for the 3D printer to produce 3D printed parts of virtually any shape according to computer control in the copying of a 3D model, and/or in translating modeling information to a detailed digital data source file. A large number of additive material manufacturing or 3D printing processes are now available. Principal distinguishing characteristics between the multiplicity of these 3D printing processes are in the manner in which the layers are deposited to create the output 3D printed parts and in the materials that are used to form the output 3D printed parts.

Certain of the 3D printing techniques melt or soften materials to produce the layers through using techniques such as, for example, selective laser melting or sintering. Others of the 3D printing techniques cure liquid materials using technologies for the deposition of those liquid materials such as stereolithography. Separately, in for example laminated object manufacturing, thin layers of paper, polymers or metals, may be cut to shape and joined together to form the output 3D printed parts. Each method has certain advantages, which are often balanced by certain disadvantages, making certain of these 3D printing techniques more or less acceptable in certain 3D printed part manufacturing scenarios. Principal considerations in choosing a particular 3D printing technique, and a system for carrying into effect that 3D printing technique, include speed of object production, device costs, device flexibility, and costs and choices of constituent materials for the production of the 3D printed parts, including, for example color gamut in the available materials when the 3D printed parts are intended to present particular color schemes. Some additive material manufacturing techniques are capable of using multiple materials in the course of "printing" or otherwise constructing the output 3D printed parts. These techniques are often able to print in multiple colors and color combinations simultaneously to produce output 3D printed parts that may then not generally require additional painting/finishing.

3D printers, in general, can print with a broad spectrum of different materials. These materials include, for example, extruded plastics and thermoplastics, high-density polyethylenes, certain metals (including sintered metals, metal powders and/or metal alloys), glued powder mixtures, ceramic materials and ceramic matrix composites, modeling clays, plasters and certain ink-like materials, including photo curable and/or ultraviolet (UV) light curable inks with high concentrations of solid components in solution. 3D printers can even be used to deposit layers of compositions of edible materials for producing foodstuffs in the culinary arts.

Oxygen inhibition is a critical problem that prevents 3D printers, particularly those employing using UV curable inks as the deposition material used in forming the 3D printed parts, from efficiently producing finished parts with a fully cured, and aesthetically pleasing (e.g., glossy) surface finishes.

SUMMARY OF DISCLOSED SUBJECT MATTER

The disclosed schemes will focus on UV curable jetted inks (with solid material particles of varying sizes and pigments suspended in clear and/or pigmented liquid suspensions) for producing 3D printed parts via an additive material manufacturing process in which individual layers are jetted to "build up" a 3D printed part on a base structural component. The disclosed techniques, therefore, are loosely based on schemes that are usable in the production of 2D images on image receiving media substrates adapted for the production of the 3D printed parts.

In the disclosed schemes, a 3D printer creates an output object or printed part one layer at a time by spreading individual and sequential layers of printing material on previously deposited layers in an additive material manufacturing process using an inkjet-like printing process and/or print head. In this process, the depositing of the layers is repeated until every layer has been printed. This technique allows the printing of full color prototypes of all shapes, including those that are comprised of certain overhanging layers that may "shadow" previously-deposited layers.

Inkjet printing systems spray materials onto a build tray in ultra-thin layers (of, for example, between 16 and 30 µm) until the 3D printed part is completed. Each layer may be heat or photo curable through the application of light, including UV light, after it is jetted.

Conventionally, when a 3D printed part is printed in a 3D printer or additive material manufacturing system, an outer surface of the formed or manufactured 3D printed part remains in contact with atmospheric oxygen from the surrounding air in an uncontrolled and/or unfiltered manufacturing environment in the 3D printer. The oxygen contact tends to prevent the surface layers, particularly those formed of UV curable inks, from correctly curing. In this regard, oxygen inhibition, particularly in UV inks, is a documented problem that prevents the outer surfaces of the 3D printed parts from curing fully. Uncured UV inks present a health hazard that cannot be present on finished 3D printed parts that are shipped to customers.

A first current technology to deal with this problem of oxygen inhibition includes introducing additional manufacturing steps that involve covering all outer surfaces of the final formed or manufactured 3D printed part with another material, a support material that may include, for example, a wax layer, around all outer (exposed) surfaces of the formed 3D printed part via a separate printing step, or adding an additional coating in a separate process. This other material may later be removed. Adding such additional steps, including additional materials results in a loss of productivity from the 3D printer, as well as requiring additional undesirable and time-consuming steps to be undertaken for the removal of the added materials.

A particular example of this first technology may involve: forming the 3D printed part; sealing the 3D printed part in a wax layer through an additional printing step; final curing the 3D printed part through the added wax layer; melting the added wax layer from the cured 3D printed part once the outer surface of the 3D printed part is sufficiently cured; exposing the wax-melted finished 3D printed part to an ultrasonic heated bath to remove more of the wax layer from intricate surfaces of the finished 3D printed part; and completing the cleaning process by hand rubbing the finished and bathed 3D printed part with a rag (or an oiled rag) to remove residual wax from the outer surfaces of the finished and bathed 3D printed part. It is easy to recognize that these additional steps represent a significant additional labor-intensive process.

A second current technology to deal this problem of oxygen inhibition includes loading the formed 3D printed parts into a particularized curing oven for a separate finishing step for the formed 3D printed parts that involves an energy-intensive extended "baking" cycle at high temperature to cure, and thereby finish, outer surfaces of the 3D printed parts. Particular drawbacks of this finishing process, in addition to the use of excessive energy and time in its implementation, include concerns that parts with thin/long geometries or thin/long component geometries may be distorted with the application of the high heat. Temperatures necessary for surface curing of certain 3D printed parts in a manner that removes the detrimental effects of oxygen inhibition in the process can exceed the glass transition temperature of the formed plastic of the 3D printed parts, or constituent parts thereof, causing melting and deformation, and otherwise damage to the physical properties of the formed 3D printed parts by the heat used in the finishing processing.

Based on the above shortfalls in the conventional finishing methods, these existing processes are unfit for use in high production 3D printing and additive material manufacturing operations.

In view of the above shortfalls in the conventional curing processes, it may be advantageous to provide a system, method, process, scheme or technique that controls the curing environment to remove oxygen inhibition concerns from the curing process in the finishing of 3D printed parts.

Exemplary embodiments of the systems and methods according to this disclosure may employ a vacuum chamber for performing a final surface curing of 3D printed parts formed or manufactured in 3D printers and additive material manufacturing processes, particularly those involving the use of UV curable inks as the deposition material in the manufacturing process.

Exemplary embodiments may facilitate more efficient and effective final curing and/or finishing of 3D printed parts without any requirement for printing additional support layers on an outer surface of the 3D printed parts.

Exemplary embodiments may employ a vacuum chamber that may have mounted on an inner surface UV lamps, lasers, arrays or other irradiating elements to cure the UV curable ink in the outer surface of the 3D printed part. In embodiments, the vacuum chamber may be formed of a radiation transmissive material or at least have a radiation transmissive window to facilitate UV lamps, lasers, arrays or other irradiating elements being mounted externally to the vacuum chamber and yet providing for exposure of the formed 3D printed parts to the curing radiation emitted from the UV lamps, lasers, arrays or other irradiating elements.

Exemplary embodiments may incorporate a conveyor movement system for movement of an in-process 3D printed part between a material deposition system and a basic curing device. The conveyor movement system may be employed to move one or more completed or formed 3D printed parts into a vacuum chamber that may be employed for finish curing of the one or more completed or formed 3D printed parts in the vacuum chamber once air (and constituent oxygen) has been evacuated from the sealed vacuum chamber.

In embodiments, a vacuum chamber for finish curing the 3D printed parts may be integral to the 3D printer. In alternative embodiments, the vacuum chamber for finish curing the 3D printed parts may be separate and apart from any one 3D printer, and may, for example, support finish curing of 3D printed parts by a plurality of 3D printers. In such embodiments, a separate robotic arm system or device may be, for example, employed to transport completed or formed 3D printed parts from an output of one or more 3D printers to an input of the vacuum chamber, directly or via a separate vacuum chamber conveyor system. In this manner, batches of 3D printed parts may be finish cured together without oxygen inhibition.

Exemplary embodiments employing the above concepts may provide a uniquely efficient and production-intensive solution for the final surface cure of formed 3D printed parts in a 3D printer.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing a comparatively higher speed process for surface curing of finished 3D printed parts formed and/or otherwise manufactured in 3D printing systems according to this disclosure, will be described, in detail, with reference to the following drawings, in which.

DETAILED DESCRIPTION OF EMBODIMENTS

The systems and methods for implementing a comparatively higher speed process for surface curing of finished 3D printed parts formed and/or otherwise manufactured in 3D printing systems according to this disclosure will generally refer to these specific utilities for those systems and methods. Exemplary embodiments described and depicted in this disclosure should not be interpreted as being specifically limited to any particular configuration a 3D printed part forming system, individual material deposition components within a 3D printed part forming system, or control and/or processing components for controlling 3D printed part forming within a 3D printed part forming system, and to any particular configuration of such a 3D printed part forming system including a vacuum chamber for finish curing formed 3D printed parts in an oxygen depleted environment to reduce oxygen inhibition of the finish curing process. It should be recognized that any advantageous use of the systems and methods for applying a vacuum in order to render an oxygen depleted environment in order to conduct a comparatively oxygen-free finish curing process for final curing of 3D printed parts formed in 3D printers and other additive material manufacturing systems such as those discussed in detail in this disclosure is contemplated as being included within the scope of the disclosed exemplary systems and methods.

The systems and methods according to this disclosure will be described as being particularly adaptable to use for 3D printed part forming in a 3D printer employing jetted inks as the material deposited on a platform for the forming of the 3D printed part. These references are meant to be illustrative only in providing a single real-world utility for the disclosed systems and methods, and should not be considered as limiting the disclosed systems and methods to any particular product or combination of devices, or to any particular type of 3D printer in which the described and depicted vacuum-aided finish curing devices and schemes may be advantageously employed. Any commonly-known processor-controlled 3D printed part forming device in which the processor may direct a vacuum aided finish curing process of a completed or formed 3D printed part that may be adapted according to the specific capabilities discussed in this disclosure is contemplated.

The disclosed embodiments are intended, among other objectives, to provide a capacity for decreasing oxygen inhibition difficulties that may arise in a final or finish curing process for 3D printed parts produced in 3D printers and additive material printing systems including those that use UV curable jetted inks as the material deposition medium for the formation of the 3D printed parts. In embodiments, the disclosed schemes proposes to place the formed 3D printed parts in a vacuum chamber for finish curing with the presence of UV light to perform the final finish curing of an outside or outer surface of the formed 3D printed parts. A key implementing technology provided by the disclosed schemes may include the use of a vacuum chamber with the UV lamps or other radiation devices installed inside the vacuum chamber. The vacuum drawn by evacuating the air (including oxygen) from the vacuum chamber may allow the UV inks forming the outside or outer surface layer of the formed 3D printed parts to cure evenly on the exposed surfaces where an oxygen inhibition phenomenon conventionally inhibits or prevents curing.

The disclosed embodiments, as depicted and discussed below, may provide an overview of the several systems, devices, methods, processes, schemes and/or techniques for integrating the use of various vacuum technologies and/or vacuum chambers into a high production 3D part printing or additive material manufacturing scheme employing a 3D printer, and particularly a 3D printer that uses UV curing inks as the deposition material medium for forming the 3D printed parts.

The disclosed systems may include an array of transport technologies for moving formed 3D printed parts from an output of a 3D printer or additive material manufacturing device to a vacuum chamber. A first of the transport technologies may provide that the 3D printed parts are transported on a conveyor belt to be fed into an input of the vacuum chamber. The conveyor belt may be made to stop when the vacuum chamber is determined to be full of a multiplicity of 3D printed parts to be finish cured. The vacuum chamber may then be sealed and evacuated prior to exposure of the 3D printed parts therein to UV curing radiation. A second of the transport technologies may provide a robotic arm that is generally configured to unload 3D printed parts from one or more 3D printers, and to place them in the vacuum chamber. A third of the transport technologies may employ individually-controlled carts onto which 3D parts may be independently printed. These carts may then be driven via automated means into the vacuum chamber. The above three general examples of transport technologies for moving formed 3D printed parts from a material deposition/printing device or component in a 3D printer to a vacuum chamber in, or associated with, the 3D printer are meant to be exemplary only and not to provide an exhaustive or inclusive list of implementing transport technologies to facilitate the disclosed vacuum-aided finish curing schemes for formed 3D printed parts.

A key technology innovation in the disclosed schemes may include the employment of a vacuum chamber to overcome the oxygen inhibition difficulties associated with outer layer finish curing for 3D printed parts. Such a technology innovation may allow for high-volume finishing capabilities for a 3D part printing or additive material manufacturing line. Once the vacuum chamber is sealed and evacuated, the UV irradiation only needs to be ON for seconds in order to finish cure or surface cure the 3D printed parts. This exposure time may be roughly equivalent to the exposure time that is generally required to cure a single printed layer during in-process 3D part printing operations in a 3D printer.

Among the benefits that may be realized from employment of the disclosed systems and methods are the following:

Elimination of costly additional printing and secondary cleaning operations;

Elimination of high temperature extended oven curing that wastes energy and can damage the 3D printed parts;

Ease of incorporation of a simplified final curing technique in line with existing 3D printing and additive material manufacturing processes; and Provision of a final surface cure to formed 3D printed parts without any tendency for over curing the inside or internal layers of the 3D printed parts.

Figure 1:
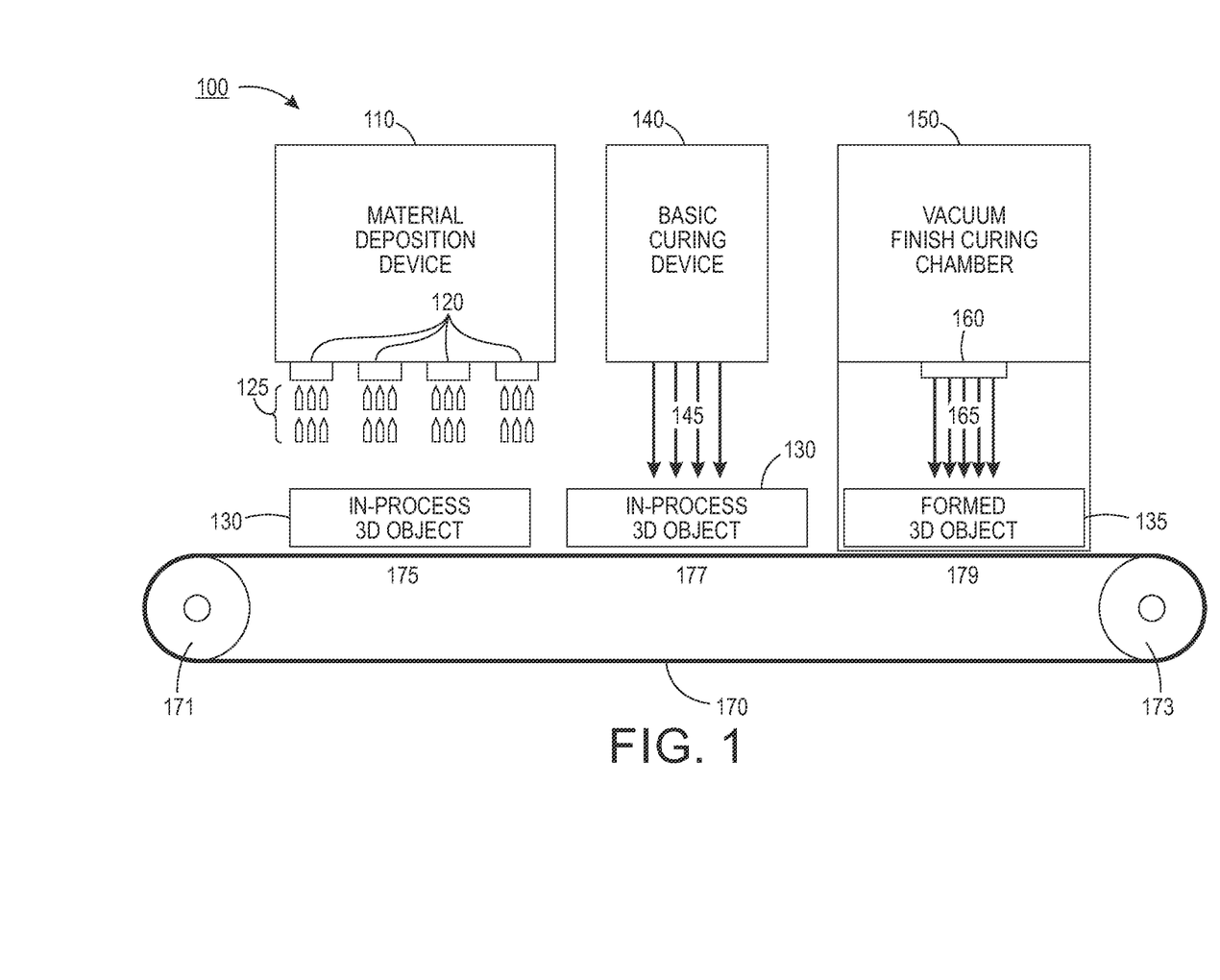
FIG. 1 illustrates a block diagram of an exemplary jetted ink 3D printed part forming system including a vacuum finish curing chamber according to this disclosure.

FIG. 1 illustrates a block diagram of an exemplary jetted ink 3D printed part forming system 100 including a vacuum finish curing chamber 150 according to this disclosure. As shown in FIG. 1, the exemplary system 100 may include a material deposition device 110 for delivering deposition material 125 from one or more individual material deposition components 120 onto a base component 170. The deposition material 125 may be in the form of UV curable inks of different colors and compositions. The one or more individual material deposition components 120 may be in the form of inkjet devices or heads for jetting different colors and compositions of UV curable inks onto the base component 170.

The base component 170 may be in the form of a movable platform for transporting an in-process 3D object 130 formed by the exemplary system 100 between a material deposition position 175, a basic curing position 177, and a finish curing position 179, the finish curing position 179 being within a vacuum finish curing chamber 150. As depicted, the base component 170 may be in the form of a belted component, such as conveyor belt, that may be usable to move the in-process 3D object 130 between the various functional positions 175,177,179 around one or more powered or following rollers 171,173. The in-process 3D object 130 may be made to cycle between the material deposition position 175 and the basic curing position 177 to have successive layers of the deposition material 125 added and successively cured in the formation of the in-process 3D object 130.

The exemplary system 100 may include a vacuum finish curing chamber 150 to facilitate providing an oxygen depleted finish or surface curing environment to substantially eliminate an oxygen inhibition phenomenon in a surface, or final, or finish curing step for a formed 3D object 135. One or more curing heads or lamps 160 (generally UV radiation producing components) for emitting curing radiation 165, including UV curing radiation, may be provided internal to the vacuum finish curing chamber 150. In general, once one or more formed 3D objects 135, are conveyed, or otherwise transported, into the vacuum finish curing chamber 150, the vacuum chamber 150 may be sealed and the air within the vacuum chamber 150 may be evacuated to provide a vacuum environment surrounding the one or more formed 3D objects 135. Once the vacuum environment is established within the vacuum finish curing chamber 150 and around the one or more formed 3D objects 135, an appropriate level of curing radiation 165 may be emitted from the one or more curing heads or lamps 160 (even for just a matter of seconds) to finish cure the one or more formed 3D objects 135. After the one or more formed 3D objects 135 are finish cured, the vacuum finish curing chamber 150 may be exhausted, and the one or more now finish cured 3D objects 135 may be conveyed, or otherwise transported, from the vacuum finish curing chamber 150.

Figure 2:
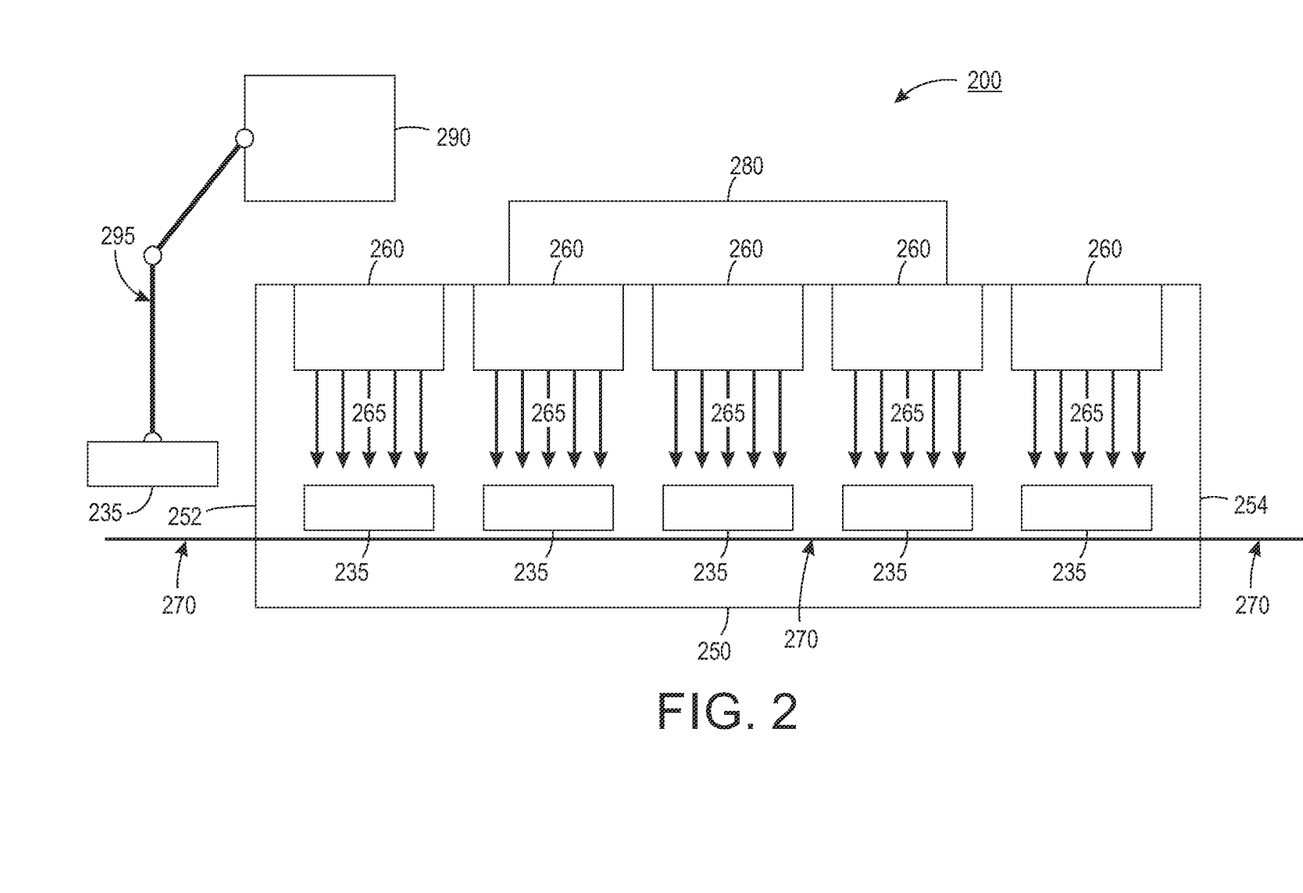
FIG. 2 illustrates a block diagram of an exemplary embodiment of a conveyor and/or robotic arm supported vacuum chamber finish curing device for finish curing 3D printed parts formed by 3D printer systems and techniques according to this disclosure.

FIG. 2 illustrates a block diagram of an exemplary embodiment of a conveyor and/or robotic arm supported vacuum chamber finish curing device 200 for finish curing 3D printed parts formed by 3D printer systems and techniques according to this disclosure.

As shown in FIG. 2, the exemplary finish curing device 200 may include a vacuum chamber 250 that may be evacuated through the use of a vacuum pump 280. The vacuum chamber 250 may have an input 252 and an exit 254. One or more curing heads or lamps 260 (generally UV radiation producing components) for emitting curing radiation 265, including UV curing radiation, may be provided internal to the vacuum chamber 250.

The exemplary finish curing device 200 may include a transport system for moving formed 3D objects 235 into the vacuum chamber 250. The transport system may include one or more of (1) a conveyor-type transfer component 270 comprising a belt or a movable platform and (2) a robotic arm unit 290, including a robotic arm 295, either of which may be generally configured to unload formed 3D objects 235 from one or more 3D printers, and to place or feed a plurality of formed 3D objects 235 into the vacuum chamber 250 via the opened chamber input 252. The conveyor-type transfer component 270 may be made to stop when the vacuum chamber 250 is determined to be full of formed 3D objects 235. The input 252 may then be closed and sealed. Air within the vacuum chamber 250 may be evacuated using the vacuum pump 280. The formed 3D objects 235 may be exposed to curing radiation 265 emitted from one or more curing heads or lamps 260 to finish cure the formed 3D objects 235 in the vacuum chamber 250. The exit 254 may be opened and the conveyor-type transfer component 270 may be used to transport the now finished formed 3D objects 235 from the vacuum chamber 250.

Figure 3:
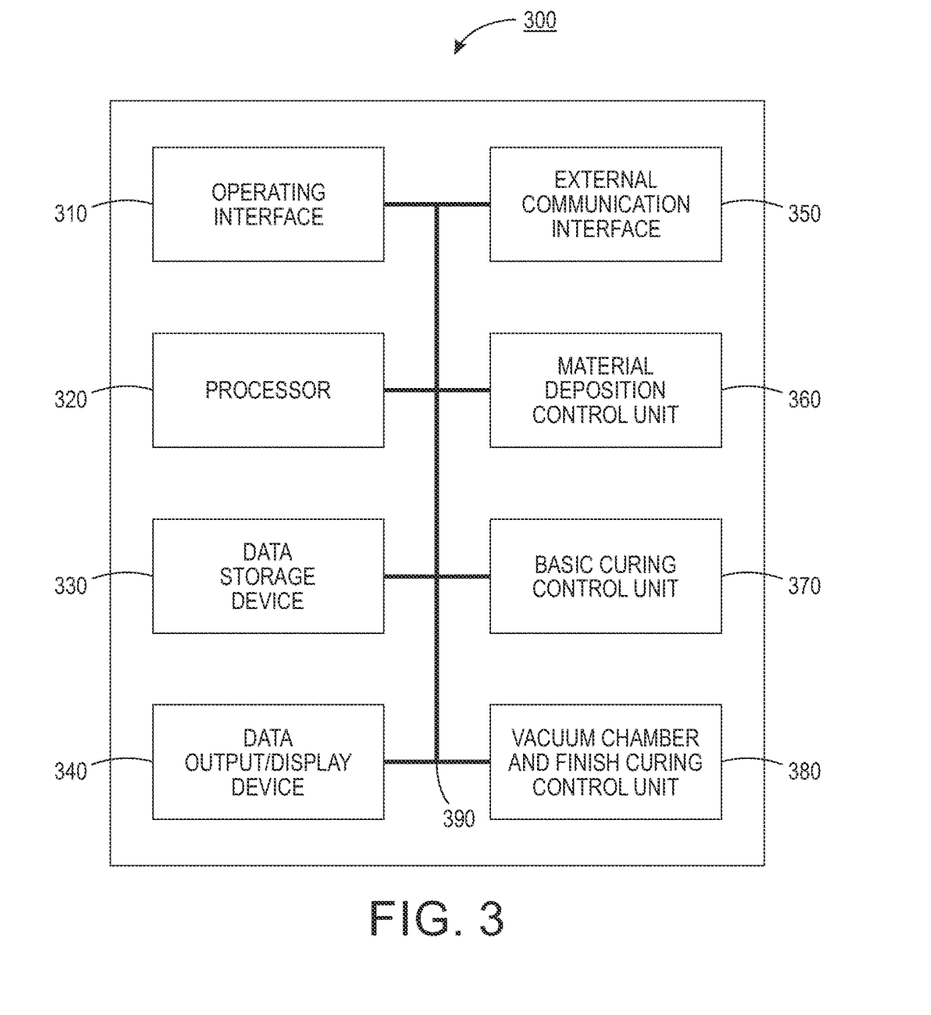
FIG. 3 illustrates a block diagram of an exemplary control system for implementing a 3D printed part forming scheme including a vacuum chamber aided finish curing of formed 3D printed parts according to this disclosure.

FIG. 3 illustrates a block diagram of an exemplary control system 300 for implementing a 3D printed part forming scheme including a vacuum chamber aided finish curing of formed 3D printed parts according to this disclosure. As shown in FIG. 3, the exemplary control system 300 is usable to manage 3D printed part forming operations in a 3D printer.

The exemplary control system 300 may include an operating interface 310 by which a user may communicate with the exemplary control system 300. The operating interface 310 may be a locally-accessible user interface associated with the 3D printed part forming device. The operating interface 310 may be configured as one or more conventional mechanisms common to control devices and/or computing devices that may permit a user to input information to the exemplary control system 300. The operating interface 310 may include, for example, a conventional keyboard, a touchscreen with "soft" buttons or with various components for use with a compatible stylus, a microphone by which a user may provide oral commands to the exemplary control system 300 to be "translated" by a voice recognition program, or other like device by which a user may communicate specific operating instructions to the exemplary control system 300. The operating interface 310 may be a part of a function of a graphical user interface (GUI) mounted on, integral to, or associated with, the 3D object forming device with which the exemplary control system 300 is associated.

The exemplary control system 300 may include one or more local processors 320 for individually operating the exemplary control system 300 and for carrying into effect control and operating functions for 3D object forming, and specifically for implementing a vacuum aided finish curing scheme, employing a vacuum chamber component, for the 3D object forming in, or with, a 3D printer with which the exemplary control system 300 may be associated. Processor(s) 320 may include at least one conventional processor or microprocessor that interprets and executes instructions to direct specific functioning of the exemplary control system 300, and control of the 3D object forming process with the exemplary control system 300.

The exemplary control system 300 may include one or more data storage devices 330. Such data storage device(s) 330 may be used to store data or operating programs to be used by the exemplary control system 300, and specifically the processor(s) 320. Data storage device(s) 330 may be used to store information regarding, for example, the 3D object forming and vacuum aided 3D object finish curing processes executed by the 3D printer with which the exemplary control system 300 is associated. The data storage device(s) 330 may include a random access memory (RAM) or another type of dynamic storage device that is capable of storing updatable database information, and for separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary control system 300, or may be provided external to, and in wired or wireless communication with, the exemplary control system 300, including cloud-based storage components.

The exemplary control system 300 may include at least one data output/display device 340, which may be configured as one or more conventional mechanisms that output information to a user, including, but not limited to, a display screen on a GUI of the 3D object forming device with which the exemplary control system 300 may be associated. The data output/display device 340 may be used to indicate to a user a status of a 3D object forming operation of a 3D printer with which the exemplary control system 300 may be associated including an operation of a vacuum chamber within which finish curing of one or more formed 3D printed parts may be carried out in an oxygen depleted environment.

The exemplary control system 300 may include one or more separate external communication interfaces 350 by which the exemplary control system 300 may communicate with components external to the exemplary control system 300. At least one of the external communication interfaces 350 may be configured as an output port to support connection to, and/or communication with, for example, a 3D object forming device, such as a 3D printer, with which the exemplary control system 300 may be associated. Any suitable data connection that provides wired or wireless communication between the exemplary control system 300 and external and/or associated components is contemplated to be encompassed by the depicted external communication interface 350.

The exemplary control system 300 may include a material deposition control unit 360 that may be used to control the deposition of material in layers to form an in-process 3D object. The material deposition control unit 360 may receive input digital data regarding a 3D object to be printed by the 3D printer with which the exemplary control system 300 may be associated. The received input digital data may come from any data source via, for example, the external communication interface 350. Either of the processor 320 or the material deposition control unit 360 itself may parse the received input digital data into a layer-by-layer scheme for depositing one or more colors or types of object forming material on an object forming base in the 3D printer. The material deposition control unit 360 may then direct the deposition of the object forming material from specific material outputs in a material deposition device within, for example, a 3D printer, including UV curable inks jetted, in layers, from jetted ink material deposition heads or nozzles in the material deposition device.

The exemplary control system 300 may include a basic curing control unit 370 that may be usable to direct a curing process for deposited layers of object forming material as each layer is deposited under control of the material deposition control unit 360 and at least partially cured under control of the basic curing control unit 370. Each of the material deposition control unit 360 and the basic curing control unit 370 may be a standalone device or unit within the exemplary control system 300, or otherwise may be a function carried into effect by one or more processors 320, connected to and in communication with one or more data storage devices 330.

An objective of the interaction between the material deposition control unit 360 and the basic curing control unit 370 and the component devices or physical units within the 3D object forming device or 3D printer, the operation of which these units control, is to form a 3D printed part in accordance with the input digital data describing the 3D printed part to be formed.

The exemplary control system 300 may include a vacuum chamber and finish curing control unit 380 for controlling operation of the finish curing vacuum chamber in, or associated with, the 3D printer that forms the 3D printed parts. The vacuum chamber and finish curing control unit 380 may also operate as a part of the processor 320 coupled to, for example, one or more data storage devices 330, or as a separate stand-alone component module or circuit in the exemplary control system 300. The vacuum chamber and finish curing control unit 380 may control steps in a formed 3D object finish curing process including one or more of (1) the opening of the input and exit portals of the vacuum chamber, (2) the positioning of one or more formed 3D objects in the vacuum chamber, (3) the evacuation of the air from the vacuum chamber with a vacuum pump or other like device, (4) the exposure of the formed 3D objects positioned in the vacuum chamber to curing radiation of a particular duration and intensity, (5) the input of air back into the vacuum chamber once the finish curing process of the formed 3D objects is complete and (6) the transport of the now finish cured formed 3D objects from the vacuum chamber.

All of the various components of the exemplary control system 300, as depicted in FIG. 3, may be connected internally, and to one or more 3D object forming devices, by one or more data/control busses 390. These data/control busses 390 may provide wired or wireless communication between the various components of the exemplary control system 300, whether all of those components are housed integrally in, or are otherwise external and connected to, a 3D object forming device or 3D printer with which the exemplary control system 300 may be associated.

It should be appreciated that, although depicted in FIG. 3 as an integral unit, the various disclosed elements of the exemplary control system 300 may be arranged in any combination of sub-systems as individual components or combinations of components, integral to a single unit, or external to, and in wired or wireless communication with the single unit of the exemplary control system 300. In other words, no specific configuration as an integral unit or as a support unit is to be implied by the depiction in FIG. 3. Further, although depicted as individual units for ease of understanding of the details provided in this disclosure regarding the exemplary control system 300, it should be understood that the described functions of any of the individually-depicted components may be undertaken, for example, by one or more processors 320 connected to, and in communication with, one or more data storage device(s) 330.

Figure 4:
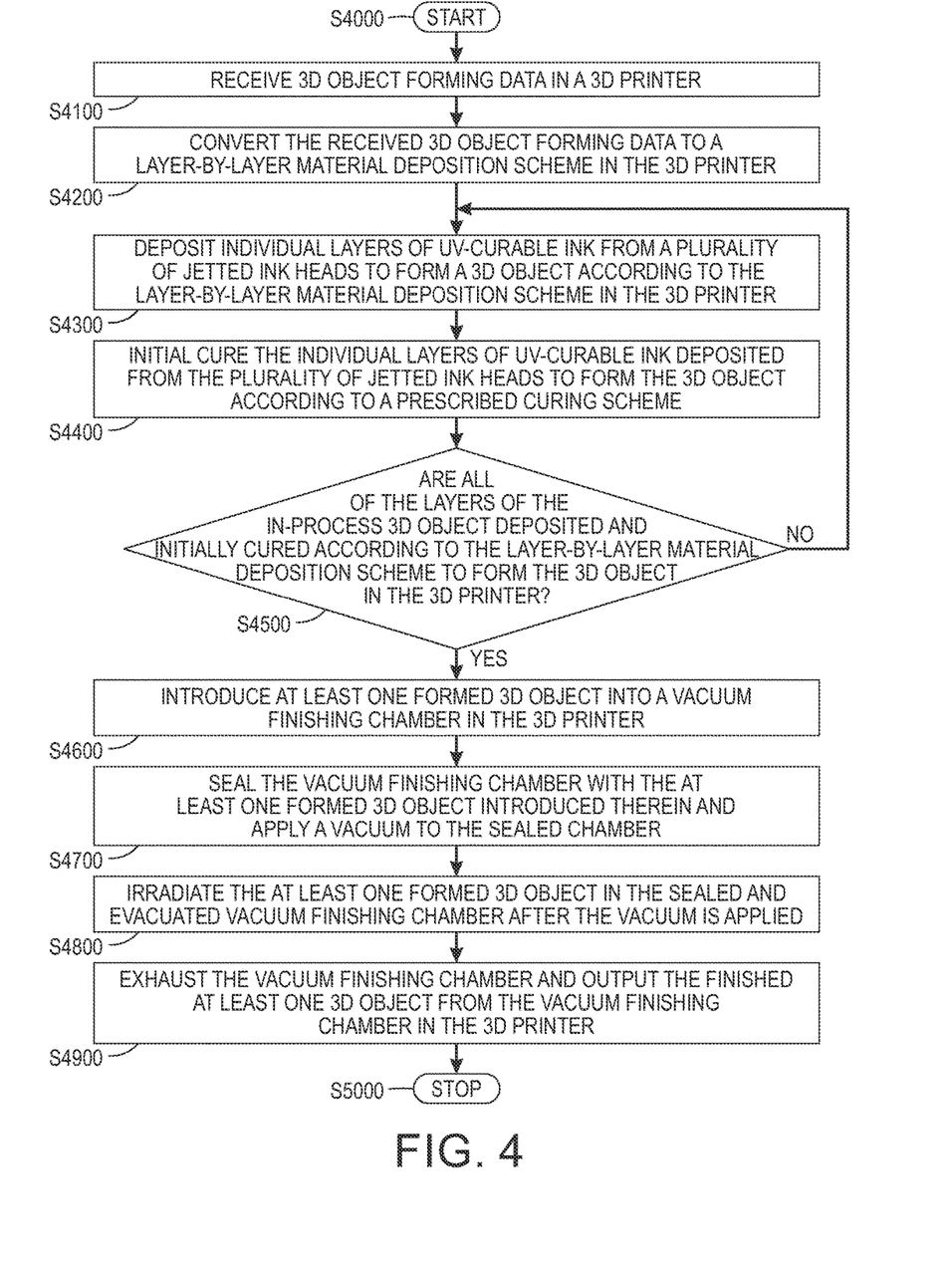
FIG. 4 illustrates a flowchart of an exemplary method for implementing a 3D printed part forming scheme including a vacuum chamber aided finish curing of formed 3D printed parts according to this disclosure.

The disclosed embodiments may include an exemplary method for implementing a 3D object forming scheme including a vacuum chamber aided finish curing of formed 3D parts. FIG. 4 illustrates a flowchart of such an exemplary method. As shown in FIG. 4, operation of the method commences at Step S4000 and proceeds to Step S4100.

In Step S4100, 3D object forming data may be received from a data source in a 3D printer, or in a control component associated with a 3D printer. Operation of the method proceeds to Step S4200.

In Step S4200, the received 3D object forming data may be parsed or otherwise converted into a layer-by-layer deposition scheme for the depositing of one or more colors and/or types of object forming material on an object forming base to produce an in-process 3D object in the 3D printer. Operation of the method proceeds to Step S4300.

In Step S4300, individual layers of UV curable ink may be deposited from a plurality of jetted ink heads or nozzles to form an in-process 3D object according to the layer-by-layer material deposition scheme executed in the 3D printer. Operation of the method proceeds to Step S4400.

In Step S4400, individual layers of UV curable ink deposited from the plurality of jetted ink heads to form the in-process 3D object may be initially cured according to a prescribed curing scheme. It should be recognized that the combination of Steps S4300 and S4400 may be recognized as appropriate building blocks in producing a 3D printed part in a 3D printer by assuring internal adherence and cohesiveness of individual layers that form the structure of the 3D printed part. Operation of the method proceeds to Step S4500.

Step S4500 is a determination step in which it is determined whether all of the layers of the in-process 3D object have been deposited and cured according to the layer-by-layer material deposition scheme to form the 3D object in the 3D printer.

If in Step S4500 it is determined that all of the layers of the in-process 3D object have not been deposited and cured according to the layer-by-layer material deposition scheme, operation of the method may revert to Step S4300.

If in Step S4500 it is determined that all of the layers of the in-process 3D object have been deposited and cured according to the layer-by-layer material deposition scheme, operation of the method proceeds to Step S4600.

In Step S4600, one or more formed 3D objects, which are completed in-process 3D objects in which all of the layers of the deposition material (the UV curable ink) have been deposited and cured, maybe introduced into a vacuum finishing chamber in the 3D printer. Operation of the method proceeds to Step S4700.

In Step S4700, the vacuum finishing chamber with the at least one formed 3D object introduced there in may be sealed, and a vacuum may be applied to the sealed vacuum chamber to produce a substantially oxygen-depleted curing environment for final curing the outer surfaces of the formed 3D objects. Operation of the method proceeds to Step S4800.

In Step S4800, the at least one formed 3D object in the sealed and evacuated vacuum chamber may be irradiated with a particular duration and intensity of curing energy to surface cure the at least one formed 3D object in an environment in which oxygen inhibition of the surface curing process is mitigated, or otherwise substantially eliminated. Operation of the method proceeds to Step S4900.

In Step S4900, the vacuum chamber may be exhausted and the finished, and now cured, formed 3-D objects may be output from the vacuum chamber in the 3D printer. Operation of the method proceeds to Step S5000, where operation of the method ceases.

As indicated above, the method may positively provide a previously unachievable level of control of the surface curing of 3D objects formed in the 3D printer.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating, product processing and 3D object forming or additive material manufacturing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by processors.

Those skilled in the art will appreciate that other embodiments of the disclosed subject matter may be practiced in additive material manufacturing devices, including 3D printers, of many different configurations.

As indicated above, embodiments within the scope of this disclosure may include computer-readable media having stored computer-executable instructions or data structures that can be accessed, read and executed by one or more processors for controlling addressable curing. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 4, except where a particular method step is a necessary precondition to execution of any other method step, i.e., in the disclosed embodiments, the vacuum is applied prior to the finish curing irradiation being applied.

Although the above description may contain specific details, they should not be construed as limiting the claims in any way. Other configurations of the described embodiments of the disclosed systems and methods are part of the scope of this disclosure.

It will be appreciated that various aspects of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A system for producing three-dimensional (3D) printed parts, comprising:
   a material deposition device configured to deposit layers of UV curable inks on an object forming base to form a 3D printed part;
   an enclosed curing chamber in which formed 3D printed parts are placed to be finish cured in an oxygen depleted environment, the enclosed curing chamber including at least (1) a closable input opening through which formed 3D printed parts are admitted into the enclosed curing chamber and (2) a vacuum device for drawing a vacuum in the enclosed curing chamber once the closable input opening is sealed;

a first curing device interposed between the material deposition device and the enclosed curing chamber in a process direction, the first curing device curing one or more of the deposited layers in the process of forming the 3D printed part;

a second curing device associated with the enclosed curing chamber that emits curing energy to finish cure the UV curable inks of the formed 3D printed parts in the enclosed curing chamber once the vacuum is drawn in the enclosed curing chamber; and a printed part transport device that transports the formed 3D printed parts from the material deposition device to the enclosed curing chamber, the printed part transport device being a conveyor transport component, the conveyor component cycling at least one of the 3D printed parts between the material deposition device and the first curing device during the forming of the at least one of the 3D printed parts to successively deposit the layers and to cure one or more of the deposited layers.

2. The system of claim 1, the conveyor transport component transporting at least one of the formed 3D printed parts to the enclosed curing chamber and supporting the at least one of the formed 3D printed parts in the enclosed curing chamber.

3. The system of claim 1, the printed part transport device being a robotic arm component.

4. The system of claim 3, the enclosed curing chamber being located separately from material deposition devices in a plurality of 3D printers, and
the robotic arm component transporting the formed 3D printed parts from the plurality of 3D printers to the enclosed curing chamber.

5. The system of claim 1, the second curing device being located within the enclosed curing chamber.

6. The system of claim 1, the enclosed curing chamber including at least one radiation transmissive surface,
the second curing device being located external to the enclosed curing chamber and configured to direct the curing energy emitted from the second curing device through the at least one radiation transmissive surface of the enclosed curing chamber to impinge on the formed 3D printed parts.

7. The system of claim 1, the second curing device comprising at least one of a lamp, a laser, and a light emitting diode (LED).

8. A method for producing 3D printed parts, comprising:
depositing layers of UV curable inks with a material deposition device onto an object forming base to form a 3D printed part in a 3D printer;
transporting formed 3D printed parts, using a transport device, from a vicinity of the material deposition device through an input portal in a curing chamber;
pre-curing, with a first curing device interposed between the material deposition device and the curing chamber in a process direction, the one or more of the deposited layers in the process of forming the 3D printed part, the transport device being a conveyor transport component, the conveyor component cycling at least one of the 3D printed parts between the material deposition device and the first curing device during the forming of the at least one of the 3D printed parts to successively deposit the layers and to cure one or more of the deposited layers;

sealing the input portal in the curing chamber to enclose the formed 3D printed parts in the curing chamber;

applying a vacuum to remove the air from the curing chamber to provide an oxygen depleted curing environment in the curing chamber;

finish curing surfaces of the formed 3D printed parts in the oxygen depleted curing environment in the curing chamber by exposing the surfaces of the formed 3D printed parts to curing energy emitted from a second curing device; and removing the finish cured 3D printed parts from the curing chamber with the transport device.

9. The method of claim 8, further comprising transporting at least one of the formed 3D printed parts to the curing chamber with the conveyor transport component, and supporting the at least one of the formed 3D printed parts in the curing chamber with the conveyor transport component.

10. The method of claim 8, the transport device being a robotic arm component.

11. The method of claim 10, the curing chamber being located separately from material deposition devices in a plurality of 3D printers, and
the robotic arm component transporting the formed 3D printed parts from the plurality of 3D printers to the curing chamber.

12. The method of claim 8, the second curing device being located within the curing chamber.

13. The method of claim 8, the curing chamber including at least one radiation transmissive surface,
the second curing device being located external to the curing chamber and directing the curing energy through the at least one radiation transmissive surface of the curing chamber to impinge on the surface of the formed 3D printed parts in the curing chamber.

14. The method of claim 8, the second curing device comprising at least one of a lamp, a laser, and an LED.

15. A non-transitory computer readable medium storing instructions that, when executed by a processor, cause the processor to execute the steps of a method for producing 3D printed parts in a 3D printer, the method comprising:
controlling a material deposition device configured to deposit layers of UV curable inks onto an object forming base to form a 3D printed part in a 3D printer;
controlling movement of a transport device to transport formed 3D printed parts from a vicinity of the material deposition device through an input portal in a curing chamber;
activating a first curing device to pre-cure one or more of the deposited layers in the process of forming the 3D printed part pre-curing, the first curing device interposed between the material deposition device and the curing chamber in a process direction, the transport device being a conveyor transport component, the conveyor component cycling at least one of the 3D printed parts between the material deposition device and the first curing device during the forming of the at least one of the 3D printed parts to successively deposit the layers and to cure one or more of the deposited layers;
directing the sealing of the input portal in the curing chamber to enclose the formed 3D printed parts in the curing chamber;

activating a vacuum device to draw a vacuum removing the air from the curing chamber to provide an oxygen depleted curing environment in the curing chamber;

activating a second curing device to finish cure surfaces of the formed 3D printed parts in the oxygen depleted curing environment in the curing chamber by exposing the surfaces of the formed 3D printed parts to curing energy emitted from the second curing device; and controlling movement of the transport device to remove the finish cured 3D printed parts from the curing chamber.

16. The non-transitory computer readable medium of claim 15, the method further comprising controlling movement of the conveyor transport component to transport at least one of the formed 3D printed parts to the curing chamber and support the at least one of the formed 3D printed parts in the curing chamber.

\* \* \* \* \*